Patented May 10, 1932

1,857,542

UNITED STATES PATENT OFFICE

HEINRICH HEIMANN AND PAUL VIRCK, OF DESSAU IN ANHALT, GERMANY, ASSIGNORS TO GENERAL ANILINE WORKS, INC., OF NEW YORK, N. Y., A CORPORATION OF DELAWARE

AMINO ARYLATED AMINO NAPHTHALENE DERIVATIVES

No Drawing. Application filed November 15, 1929, Serial No. 407,564, and in Germany December 13, 1926.

Our present invention relates to new aminonaphthalene derivatives substituted in the amino-group by an amino benzene compound and to a process of manufacturing same.

Further details may be seen from the specification following hereafter.

In German Letters Patents Nos. 122,570, 125,589, and Zeitshrift für Farben- und Textil Chemie 1904, page 57 et seq., has been described the production of arylated amino naphthalene derivatives by treating aminonaphthalenes or hydroxynaphthalenes with primary amino-aryl-compounds of the benzene series in the presence of a sodium bisulfite solution. It is stated therein that this reaction runs smoothly and gives satisfactory yields of the products desired when using as one component aminonaphthalene or hydroxynaphthalene compounds containing in their molecule sulfuric acid or carboxylic acid groups. But when using aminonaphthalenes or hydroxynaphthalenes not substituted by sulfuric acid or carboxylic acid groups the yield is very unsatisfactory (see Zeitschrift für Farben- und Textil Chemie 1904, page 58, and Journal für praktische Chemie II, 75, page 252).

In contradistinction to these statements, we have found that arylated compounds of aminonaphthalenes may be obtained corresponding to the general formula $$C_{10}H_5Y_{3-m}(NH.C_6H_{5-n}X_n)_m$$

wherein Y stands for H or a univalent substituent except the groups —COOH, —SO₃H and wherein at least one X means the groups

(R and R' meaning H, alkyl, aryl or substituted aryl) and the other X's mean H, alkyl, halogen or the groups —COOH, —SO₃H and m and n mean 1 or 2, by heating in the presence of an aqueous solution of a bisulfite salt a naphthalene compound of the general formula

in which at least one Y represents the groups —OH or —NH₂ and the other Y's represent H or halogen with a diamino compound of the benzene series being substituted or not. As a diamino compound of the benzene series we may use for instance ortho-, meta-, or paradiamines which may be substituted in the nucleus by halogen, alkyl or the groups —COOH or —SO₃H. Furthermore, we may use diaminobenzenes substituted in one amino group to form for instance aminomono or dialkyl- or aryl-amino benzene or 4-amino-4'-hydroxydiphenylamine or 4-4'-diaminodiphenylamine-2-sulfonic acid. The yields are very satisfactory and the products are in a pure state if the reaction is carried out under suitable conditions namely whilst stirring intensively and at temperatures not considerably below the boiling point of the mixture to not considerably above 150° C. When carrying out the reaction above the boiling point of the reaction mixture a closed vessel must be used; in this case the resulting pressure is a function from the temperature applied and from the tension of the reacting liquid. The treating of the reaction mixture at the temperatures given above is continued until a test proves that unchanged naphthalene compound applied as starting material is no longer present. It is further of an advantage for obtaining a good yield that the amino benzene compound is used in an excess above the theoretical amount. When using 120–150 per cent of the theoretical amount of the amino benzene compound the best result is obtained.

The following examples serve to illustrate the invention:

1. 144 parts of 2-hydroxynapthalene and 150 parts of 1.2-diaminobenzene are stirred for 40 hours at a temperature of 115–120° C. in a closed enamelled vessel with 4000 parts of a solution of sodium bisulfite of 19° Bé. strength. After cooling to 60–70° C. the product of the reaction is separated from the aqueous solution and purified by dissolving in hot water which contains hydrochloric acid. After cooling the (2'-aminophenyl)-2-aminonaphthalene hydrochloride is separated in the form of little needles. By addition of a solution of sodium carbonate the free base is obtained. Recrystallized from dilute alcohol it melts at 96–97° C. From an aqueous solution containing hydrochloric acid it is absorbed by animal fibers on which reddish brown shades are obtained by a treatment with an oxidizing agent.

2. 144 parts of 2-hydroxynaphthalene and 130 parts of 1.3-diaminobenzene are heated to the boiling point for 80 hours whilst stirring with 4000 parts of a solution of sodium bisulfite of 19° Bé. strength in a leaded or enamelled vessel provided with a stirrer and a reflux apparatus. The product of reaction is separated from the hot aqueous solution; it may be purified by treating with hot water to which some sodium hydroxide solution is added. It may be recrystallized from a dilute solution of hydrochloric acid.

3. 137 parts of 1.4-diaminobenzene and 144 parts of 2-hydroxynapthalene are boiled for 90–100 hours whilst stirring with 4000 parts of a solution of sodium bisulfite of 20° Bé. strength in a leaded or enamelled vessel provided with a stirrer, a heating device and a reflux apparatus. After cooling to 60–70° C. the (4'-aminophenyl) 2-aminonapthalene thus obtained is filtered, pressed and well washed with warm water.

When treating the 1-hydroxynapthalene under the same conditions the (4'-aminophenyl)-1-aminonaphthalene is obtained.

4. In a leaded or enamelled vessel provided with a stirrer and a reflux apparatus 288 parts of 1-aminonapthalene, 400 parts of 4-amino-4'-hydroxydiphenylamine and 7000 parts of a solution of sodium bisulfite of about 20° Bé. strength are boiled whilst stirring until after about 120 hours only small quantities of the unchanged starting materials are present. After cooling to 70–80° C. the product of reaction is separated by filtration, pressed and digested with a very dilute solution of hydrochloric acid and then with hot water to remove the unchanged starting materials.

5. In a vessel described in example 3 140 parts of 2-hydroxynaphthalene and 280 parts of 4.4'-diaminodiphenylamine-2-sulfonic acid are boiled with 2000 parts of a solution of sodium bisulfite of 36° Bé. strength and 2000 parts of water for 50–70 hours whilst stirring. The product of condensation is separated by addition of an inorganic acid. It is the 4-(β-naphthylamino)-4'-aminodiphenylamine sulfonic acid which is purified by dissolving in a dilute solution of sodium carbonate and reseparating by addition of an acid. In an aqueous suspension containing soap it is absorbed by acetate silk which is dyed in blue shades by a subsequent treatment with a weak oxidizing agent.

A 4-(α-naphthylamino)-4'-aminodiphenylamine-sulfonic acid is obtained when applying 1-amino- or 1-hydroxynaphthalene instead of 2-hydroxynaphthalene.

It is obvious to those skilled in the art that our present invention is not limited to the foregoing examples or to the details given therein. Thus for instance, the hydroxynaphthalenes chosen in the examples may be substituted by the corresponding aminonaphthalenes and vice-versa.

Furthermore, other diaminobenzene compounds substituted in one amino group or in the benzene nucleus may be employed or we may use amino or hydroxynapthalene being substituted in the nucleus, for instance by halogen. It may be stated that instead of sodium bisulfite other soluble bisulfite salts may be used. It is advantageous when employing a more dilute solution of soluble bisulfite salt to heat to a higher temperature and when employing a more concentrated solution to heat only nearly to the boiling point of the reaction mixture. The aminobenzene compound employed in an excess may be recovered and reused.

The present application is a continuation in part of our co-pending application Serial No. 236,358, filed November 28, 1927.

What we claim is:—

1. The process which comprises treating, while agitating, in the presence of an aqueous solution of a bisulfite salt at a temperature between 100° and 150° C. a naphthalene compound of the general formula

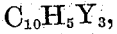

in which at least one Y represents the group —OH or —NH₂ and the other Y's represent H or halogen, with a diamino compound of the general formula

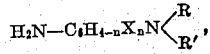

wherein X means H, halogen, alkyl, —COOH, —SO₃H, wherein n stands for 0, 1 or 2 and wherein R and R' represent H, alkyl, or phenyl which may be substituted by halogen, alkyl, —OH, —COOH, or —SO₃H.

2. The process which comprises treating, while agitating, in the presence of an aqueous solution of a bisulfite salt at a temperature between 100° and 150° C. a naphthalene compound of the general formula

in which at least one Y represents the group —OH or —NH₂ and the other Y's represent H or halogen, with a diamino compound of the benzene series substituted in one amino group by a phenyl radicle.

3. The process which comprises treating, while agitating, in the presence of an aqueous solution of a bisulfite salt at a temperature between 100° and 150° C. a naphthalene compound of the general formula

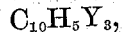

in which at least one Y represents the group

—OH or —NH₂ and the other Y's represent H or halogen, with 4.4'-diaminodiphenylamine sulfonic acid.

4. As new products the naphthalene derivatives of the general formula

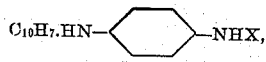

X meaning H, alkyl or phenyl which may be substituted by halogen, alkyl, —COOH, or —SO₃H, which products in the dried state are gray crystalline powders insoluble in water, slightly soluble in benzene, alcohol, ether, and soluble in dilute hydrochloric acid, having in an acid solution an affinity to animal fibers on which they may be fixed from gray to violet to blue to green to deep black shades fast to milling and to light when treated with an oxidizing agent.

5. As new products the naphthalene derivatives of the general formula

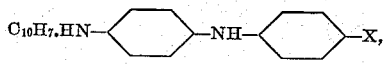

X meaning H, alkyl, —NH₂, —OH, halogen, which products in the dry state are gray crystalline powders insoluble in water, slightly soluble in benzene, alcohol, ether, and soluble in dilute hydrochloric acid, having in an acid solution an affinity to animal fibers on which they may be fixed from gray to bluish black shades fast to milling and to light when treated with an oxiding agent.

6. As new products the naphthalene derivatives of the general formula

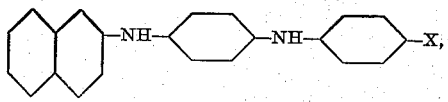

X meaning H, alkyl, —NH₂ —OH, halogen, which products in the dry state are gray crystalline powders insoluble in water, slightly soluble in benzene, alcohol, ether, and soluble in dilute hydrochloric acid having in an acid solution an affinity to animal fibers on which they may be fixed from gray to bluish black shades fast to milling and to light when treated with an oxidizing agent.

7. As new products the naphthalene derivatives of the general formula

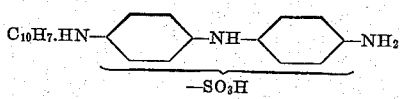

which products in the dry state are gray crystalline powders being soluble in a weakly alkaline aqueous solution from which they are not precipitated by addition of dilute hydrochloric acid if the solution is hot having in such an acid solution an affinity to animal fibers on which they may be fixed from gray to bluish black shades fast to milling and to light when treated with an oxidizing agent.

8. As a new product the 4-(β-naphthylamino)-4'-amino-diphenylamine sulfonic acid of the formula

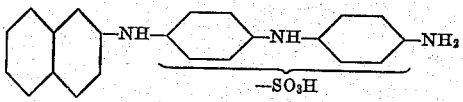

which is in the dry state a gray crystalline powder being soluble in a weakly alkaline aqueous solution from which it is not precipitated by addition of dilute hydrochloric acid at an elevated temperature, having in such an acid solution an affinity to animal fibers on which it may be fixed from gray to bluish black shades fast to milling and to light when treated with an oxidizing agent.

In testimony whereof we affix our signatures.

HEINRICH HEIMANN.
PAUL VIRCK.